(12) United States Patent
Kallast et al.

(10) Patent No.: US 12,202,303 B2
(45) Date of Patent: Jan. 21, 2025

(54) PORTABLE TIRE CHANGING STAND

(71) Applicants: Tõnu Kallast, Pärnu (EE); Jakob Saks, Kersleti (EE)

(72) Inventors: Tõnu Kallast, Pärnu (EE); Jakob Saks, Kersleti (EE)

( * ) Notice: Subject to any disclaimer, the term of this patent is extended or adjusted under 35 U.S.C. 154(b) by 0 days.

(21) Appl. No.: 18/587,220

(22) Filed: Feb. 26, 2024

(65) Prior Publication Data

US 2024/0190190 A1 Jun. 13, 2024

Related U.S. Application Data

(63) Continuation of application No. PCT/IB2022/057976, filed on Aug. 25, 2022.

(30) Foreign Application Priority Data

Aug. 25, 2021 (EE) ..................................... 2100033

(51) Int. Cl.
 *B60C 25/05* (2006.01)
 *B60C 25/02* (2006.01)
 *B60C 25/04* (2006.01)

(52) U.S. Cl.
 CPC .......... *B60C 25/0506* (2013.01); *B60C 25/02* (2013.01); *B60C 25/04* (2013.01)

(58) Field of Classification Search
 CPC ....... B60C 25/02; B60C 25/04; B60C 25/132; B60C 25/0506; B60C 25/138; B60C 25/0545
 USPC ................................ 157/1.21, 1.22, 1.24, 1.3
 See application file for complete search history.

(56) References Cited

U.S. PATENT DOCUMENTS

| | | | |
|---|---|---|---|
| 1,591,193 A | 7/1926 | Weaver | |
| 1,646,511 A | 10/1927 | Weaver et al. | |
| 2,474,926 A | 7/1949 | York | |
| 2,656,882 A * | 10/1953 | Rodgers | B60C 25/02 157/1.26 |

(Continued)

FOREIGN PATENT DOCUMENTS

| | | | | |
|---|---|---|---|---|
| CN | 214295431 U * | 9/2021 | ........... | B60C 25/132 |
| EP | 3815933 A1 | 5/2021 | | |

OTHER PUBLICATIONS

International Search Report dated Nov. 14, 2022 in corresponding application PCT/IB2022/057976.

(Continued)

*Primary Examiner* — Bryan R Muller
(74) *Attorney, Agent, or Firm* — Muncy, Geissler, Olds & Lowe, P.C.

(57) ABSTRACT

A portable tire changing stand that includes a frame, a rear support leg and a horizontal front leg that attaches to the lower end of the frame and is removable. A removable center shaft perpendicular to the frame is attached to the central part of the frame. For accurate centering of the rim, a stepped bushing is arranged on the center shaft. Plastic support surfaces are attached to the frame above and below the center shaft. A tire lever is attached to the socket and a tire bead is pushed off the rim with the plate attached to the lever. The position of the plate can be adjusted by changing the distance between the bracket and the center shaft. A socket is attached to the ratchet mechanism and the lever attached to it gives the mounting head movement around the center shaft.

7 Claims, 5 Drawing Sheets

(56) References Cited

U.S. PATENT DOCUMENTS

| | | | |
|---|---|---|---|
| 3,050,096 A * | 8/1962 | Lydle | B60C 25/04 157/1.22 |
| 3,889,542 A * | 6/1975 | Carrigan | G01M 1/045 73/460 |
| 4,360,052 A | 11/1982 | Norris | |
| 4,381,028 A | 4/1983 | Patry | |
| 4,676,291 A | 6/1987 | Bolger | |
| 5,232,035 A * | 8/1993 | Adams, Jr. | B25H 3/06 157/14 |
| 6,276,423 B1 | 8/2001 | Goracy | |
| 7,631,681 B1 * | 12/2009 | Petersen | B60C 25/13 157/1.17 |
| 2010/0051205 A1 | 3/2010 | Ochoa | |
| 2011/0290428 A1 * | 12/2011 | Roussel | B60B 30/06 157/1.22 |
| 2024/0278605 A1 * | 8/2024 | Peterson, Jr | B60C 25/0572 |

OTHER PUBLICATIONS

VERcity.ru: "Rabaconda: portable machine for quick tire changing" Feb. 20, 2016 https://auto.vercity.ru/magazine/7694_rabaconda_portativnyi_stanok_dlja.

* cited by examiner

PORTABLE TIRE CHANGING STAND

This nonprovisional application is a continuation of International Application No. PCT/IB2022/057976, which was filed on Aug. 25, 2022, and which claims priority to Estonian Patent Application No. U202100033, which was filed in Estonia on Aug. 25, 2021, and which are both herein incorporated by reference.

BACKGROUND OF THE INVENTION

Field of the Invention

The invention relates to tire changing equipment, in particular to a manually operated portable tire changing stand for motorcycles.

Description of the Background Art

There are different type of tire changing stands known in the art. This stand shown in FIG. 3 can be considered the closest solution. It is a tire changing stand for changing motorcycle tires, mainly on motorcycles with cast rims, which consists of a cross-shaped frame with adjustable legs, a center shaft attached to the center of the frame and pointing upwards, an extendable lever system moving in the vertical direction, which is attached to the center shaft after placing the rim on the frame and which holds the rim in place, a rotating tire mounting head and a lever.

The rim whose tire you want to change is placed on the frame and center shaft. A lever is attached to the socket that is attached to the bracket, and the tire bead is pushed off the rim with the plate on the side. By turning the rim, pressure is applied repeatedly until the entire tire bead is pushed off from the rim. Then the wheel is turned to the other side and the same activity is repeated. A rod is then placed on the frame to prevent the rim from rotating, and then a rotating tire mounting head is mounted on top of the rim. The bead of the tire is pulled over the tire mounting head with a tire lever and the tire is dismounted from the rim by turning the tire mounting head with a lever. The new tire is mounted on the rim by turning the tire mounting head using a lever. The disadvantage of this solution can be considered the fact that the tire change takes place in a low, uncomfortable position, i.e. lacks ergonomics. The frame tends to move when the lever is turned, and the tire mounting head does not move relative to the rim.

A well-known tire changer is shown in FIG. 4, which uses a long lever that rests on the center shaft of the tire changer and at the ends of which there are special parts for mounting and dismounting of the tire.

A typical electric industrial tire changer is shown in FIG. 5, which is used by professional tire technicians. In this solution, the rim is attached to the turntable with four grippers on the outer edge of the rim. During the tire change, the wheel rotates and the tire mounting head is stationary.

Other tire changers or related devices are known such as the one described in U.S. Pat. No. 2,474,926. It is a portable tire changing stand comprising a frame, a rear support leg, a horizontal leg which attaches to the lower end of the frame, a lever system, a plate attached to the lever on which the tire bead is pushed off the rim and a frame located at an angle of 30-90 degrees to the base surface of the tire changing stand. This device only has a bead breaker function. It cannot mount or dismount a tire from its rim.

Another device is described in U.S. Pat. No. 1,591,193 as comprising a standard, means to support a rim and its tire on said standard in a general upright position and with capacity for rotation about their common axis, a tire-tool adapted to engage the tire, a mounting for said tire-tool permitting the latter to have limited play only around the axis of the supported rim and tire and to move toward and from the tire to permit the removal of the tire from the rim by force applied manually and by cooperation with the rim and tire to effect their manual rotation about their axis to bring new portions of the tire into the restricted field of action of said tire-tool. This device only has a bead breaker function too. It cannot mount or dismount a tire from its rim.

EP3815933A1 discloses a portable tire changer system for a kart tire mounted on a wheel rim that includes a supporting base, supporting rotatable means, a supporting plate for supporting the wheel rim and connecting means projecting from said supporting plate and configured to be inserted into an internal cavity of the wheel rim and to engage centring and fixing holes thereof; the portable tire changer system comprises a covering element configured to engage and cover an external annular edge of the wheel rim so as to prevent a working lever used for removing a tire from the wheel rim during a dismounting procedure to contact the external annular edge; the portable tire changer comprises driving means to rotate the supporting means and mounting means comprising an arm, movable and having a first end fixed to said supporting base and a second end to which an introducer element is fixed that is made of non-metallic material and configured to abut the external annular edge of the wheel rim in a mounting procedure in order to insert and mount a tire on said wheel rim by rotating said supporting means.

U.S. Pat. No. 1,646,511 describes a tire-changer comprising a support, a main rim-clamping jaws on said support, means to expand and contract said jaws, supplemental rim-clamping jaws movable with said main jaws and designed to clamp a rim in a position different from one clamped by said main jaws, and means to remove a tire from a rim, while the latter is clamped by said supplemental jaws.

SUMMARY OF THE INVENTION

It is therefore an object of the invention to provide a tire changing stand that it is compact and portable and is easy to transport thanks to its light weight (approximately 13 kg).

The portable tire changer includes a frame that sits at a 30-90 degrees angle to the base of the tire changer.

In addition, the portable tire changing stand includes a rear support leg and a horizontal front leg that attaches to the lower end of the frame and is removable. A removable center shaft perpendicular to the frame is attached to the center of the frame, where the ratchet mechanism with the tire mounting head is attached. For accurate centering of the rim, there is a stepped bushing on the center shaft.

Plastic support surfaces are attached to the frame above and below the center shaft. A socket is attached to the ratchet mechanism, and the removable lever attached to it gives the mounting head movement around the center shaft. The distance of the tire mounting head from the center shaft can be extended by changing the position of the arm. The portable tire changing stand also includes a rod that prevents wheel rotation and a lever system, the position of which can be adjusted by changing the distance of the bracket at the upper end of the frame to the center shaft. A removable lever is attached to the socket that is attached to the bracket, and the tire bead is pushed off the rim with the plate attached to the lever.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
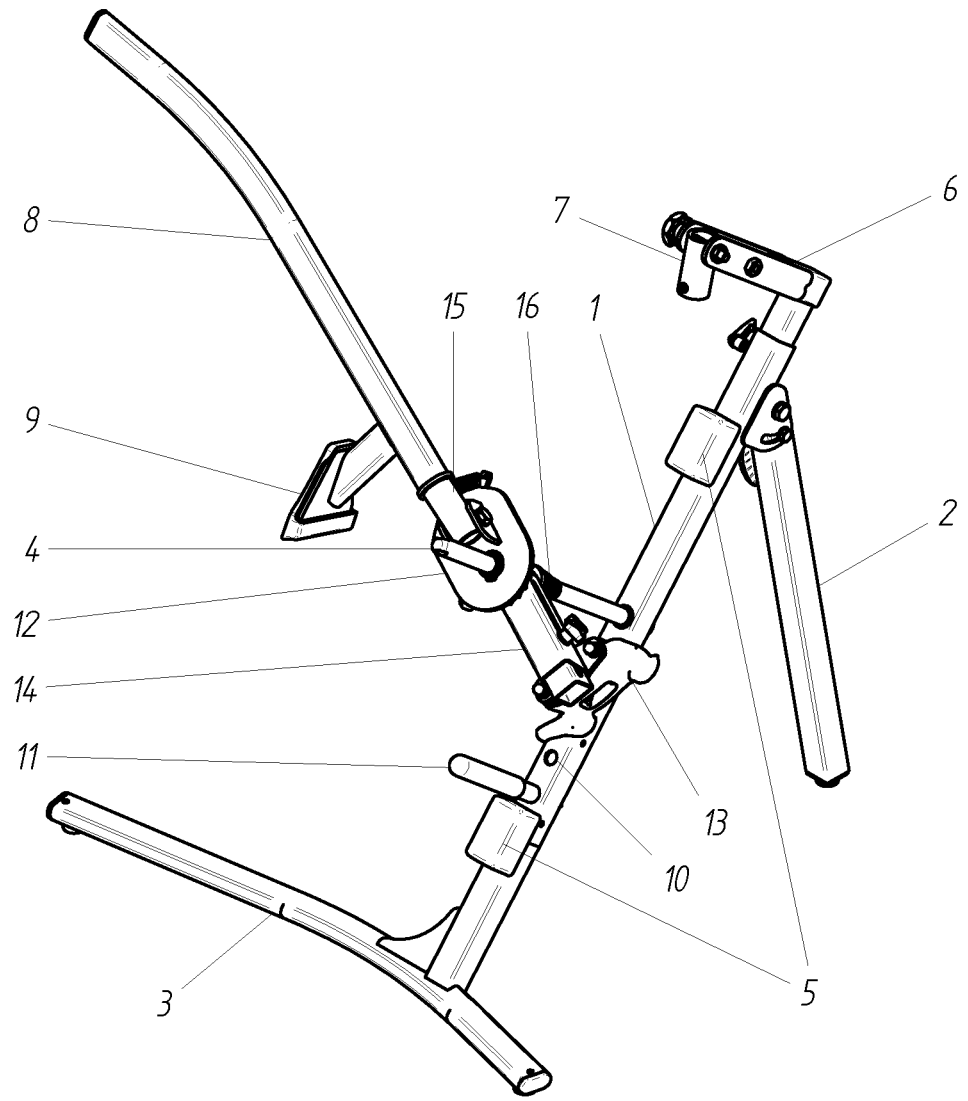
FIG. 1 describes a general view of a portable tire changing stand.
Figure 2:
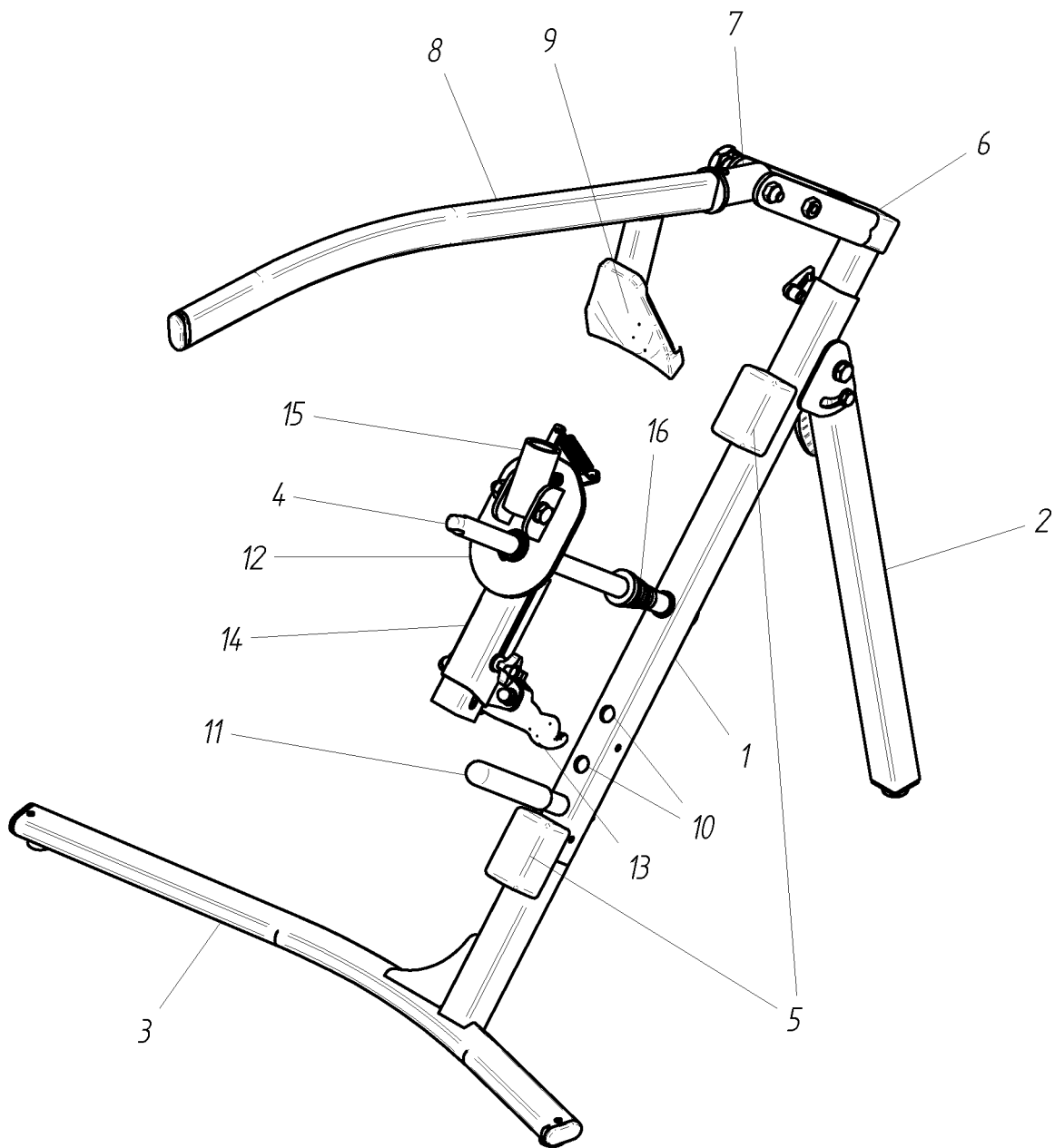
FIG. 2 describes the position of the tire mounting head.
Figure 3:
FIGS. 3 to 5 show examples of the prior art.
Figure 4:
Figure 5:
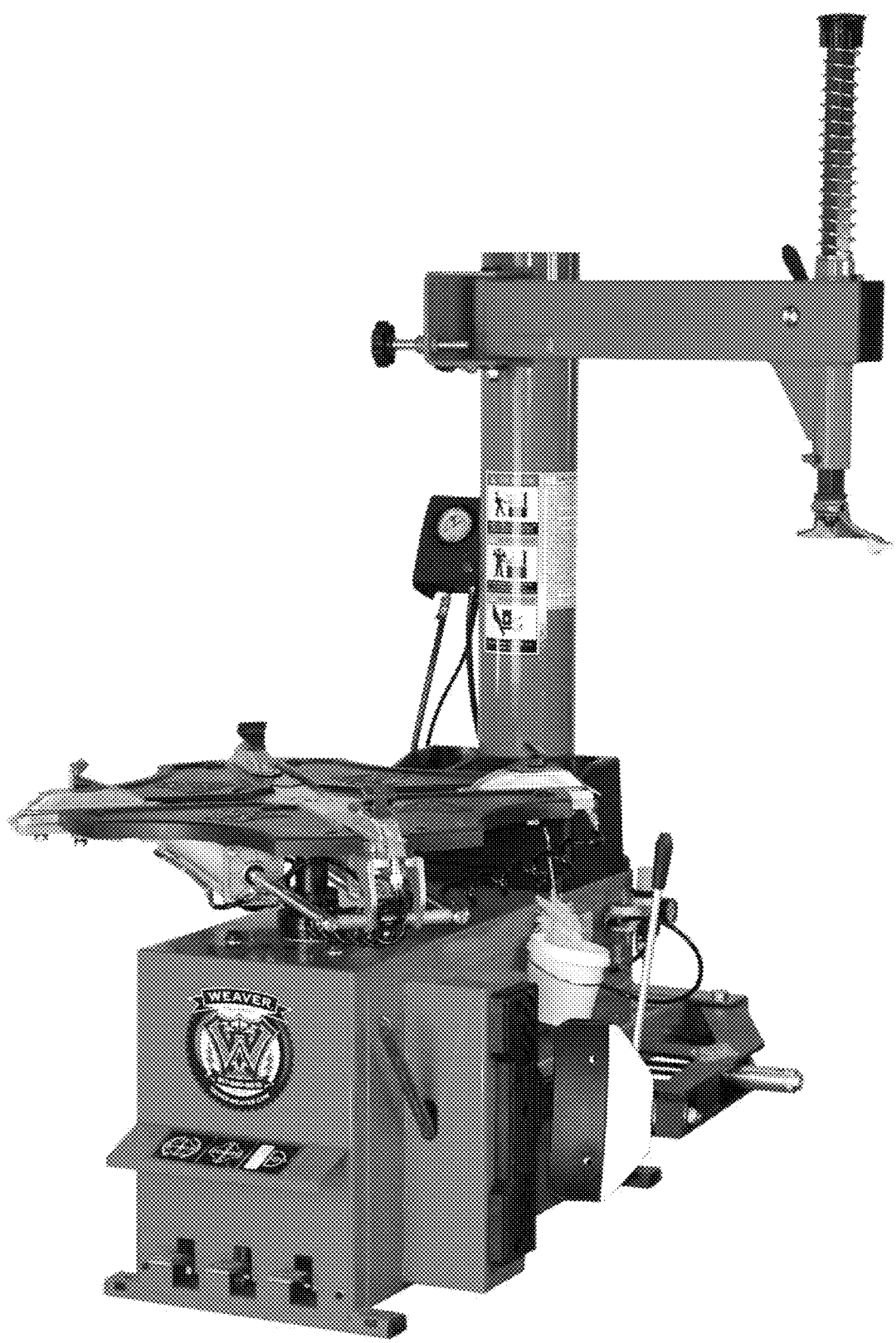

The tire changing stand shown in FIG. 1 and FIG. 2 includes a frame 1, a rear support leg 2, which can be rotated relative to the frame to achieve a compact position, and a horizontal front leg 3, which is attached to the lower end of the frame and is removable. The frame is located at an angle of 30-90 degrees to the base of the tire changing stand. A removable center shaft 4 perpendicular to the frame 1 is attached to the central part of the frame, and plastic support surfaces 5 of the rim attached to the frame 1 above and below the center shaft 4, which are movable relative to the frame 1. A lever system is attached to the upper end of the frame 1, the position of which can be adjusted according to the diameter of the rim by changing the distance of the bracket 6 in relation to the center shaft 4. A lever 8 is attached to the socket 7 attached to the bracket 6, and the tire bead is pushed off the rim with the plate 9 attached to it. There are holes 10 in the frame near the lower plastic support surface, where the rod 11 preventing the rotation of the rim is fixed. The ratchet mechanism 12 with the tire mounting head 13 is placed on the center shaft 4. The distance of the tire mounting head 13 from the center shaft 4 can be extended by changing the position of the arm 14. A socket 15 is attached to the ratchet mechanism 12, into which a lever 8 is inserted and the tire mounting head 13 is moved around the center shaft 4. A step bushing 16 for centering the rims is placed on the center shaft.

The rim whose tire is to be changed is placed on the frame 1 and the center shaft 4. In order to accurately center the rim, a stepped bushing 16 is placed on the center shaft 4. The lever 8 is inserted into the socket 7 and the plate 9 on the lever 8 is placed in contact with the side surface of the tire, and the tire bead is pushed off the rim with the help of the lever 8. The positions of the bracket 6 can be changed to achieve the exact position of the plate 9 in relation to the rim. The rim is rotated and pressure is applied from different angles until the bead of the tire is completely pushed off from the rim. The rim is then turned to the other side and the same process is repeated. To remove the tire from the rim, a rod 11 preventing the rotation of the rim is placed on the frame 1, and a ratchet mechanism 12 with a tire mounting head 13 is installed on the center shaft 4. The tire mounting head 13 is installed on the edge of the rim, and the bead of the tire is partially pulled over the tire mounting head 13 with a tire lever. Then the lever 8 is installed in the socket 15 on the ratchet mechanism 12, and by pressing the lever 8 downwards a movement is given to the tire mounting head 13. To achieve the best stability of the tire changer, the lever 8 is moved to a quarter turn. When reaching the lower position of the lever, the ratchet mechanism 12 allows the lever to be freely returned to the initial position and the movement repeated. With repeated up-and-down movements of the lever 8, the tire mounting head 13 makes a full circle on the rim, and as a result, the first bead of the tire is removed. The mutual position of the frame 1 and the front leg 3 of this tire changing stand creates a stable system for pushing down the lever 8, and the structure stays in place during operation of the tire mounting head 13 without the user having to stabilize it. The same technique is repeated to remove the other bead of the tire.

To mount a tire, the tire is pushed over the edge of the rim as much as possible with the hands, and both beads of the tire are installed by operating the tire mounting head 13 via the lever 8 as previously described. In order to remove the rim from the tire changing stand, the lever 8, the ratchet mechanism 12 with the tire mounting head 13 and the stepped bushing 16 must be removed. Moving the tire changing stand from the transport position to the working position is simple, fast and can be done without additional tools. It can be used for changing motorcycle tires with rims of different diameters, which is primarily intended for tubeless tires and tires with inner tube.

Known solutions are characterized by the fact that they are relatively low and the lever is pulled horizontally. Therefore, the tire changer is unstable and inconvenient to use. This solution eliminates this problem, because the tire changer is located at an angle, thanks to which the tire change can be done in an upright position, and when the lever is pressed, the tire changer remains stable. Solutions known from the state of the art are also characterized by the fact that the tire changing stand must be bolted/rigidly connected to the ground/floor, which limits the device's portability and places of use. These industrial tire changing devices are heavy and not portable. However, this tire changer is lightweight and easy to disassemble and assemble, which makes it convenient to carry.

At least two factors create greater stability of this solution: (a) when operating the tire mounting head, the force applied on the lever is directed through the frame towards the base surface of the tire changing stand, which means that the user does not have to keep the tire changing stand in place at the same time, and (b) the ratchet mechanism between the lever and the tire mounting head allows the lever to be pressed from the same position during the entire tire changing process.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A portable tire changing stand comprising: a frame; a rear support leg; a horizontal front leg removably attached to a lower end of the frame, the frame being located at an angle of 30-90 degrees to a bottom surface of the tire changing stand configured to rest on a supporting surface during use; a center shaft arranged substantially perpendicular to the frame and being removably attached to a center of the frame; plastic support surfaces provided for a rim of a tire, the plastic support surfaces being attached to the frame above and below the center shaft; a bracket attached to the upper end of the frame; a first socket attached to the bracket; a rod removably attached to the frame near a lower plastic support surface to prevent rotation of the rim, the rear support leg being rotatably connected to the frame; a ratchet mechanism attached to the center shaft; a tire mounting head; and a second socket attached to the ratchet mechanism; a lever adapted to be removably inserted into the first socket and the second socket alternatively; and a plate attached to the lever, the plate adapted to be put into contact with a side surface of the tire, wherein after inserting the lever in the second socket, applying a downward pressure on the lever will provide movement to the tire mounting head around the center shaft, and the ratchet mechanism enables the lever to be freely returned to an initial position relative to the tire mounting head, whereby the movement is repeatable.

2. The portable tire changing stand according to claim 1, wherein a stepped bushing is located on the center shaft for exact centering of the rim.

3. The portable tire changing stand according to claim 1, wherein the position of the bracket is adapted to be adjusted according to the diameter of the rim by changing its distance to the center shaft.

4. The portable tire changing stand according to claim 2, wherein the position of the bracket is adapted to be adjusted according to the diameter of the rim by changing its distance to the center shaft.

5. The portable tire changing stand according to claim 1, wherein the portable tire changing stand further comprise an arm between the tire mounting head and the ratchet mechanism, and wherein the distance between the tire mounting head and the center shaft is extendable by changing the position of the arm.

6. The portable tire changing stand according to claim 4, wherein the portable tire changing stand further comprise an arm arranged between the tire mounting head and the ratchet mechanism, the distance between the tire mounting head and the center shaft being extendable by changing the position of said arm.

7. The portable tire changing stand according to claim 1, wherein the frame further comprises holes for fixing the rod to the frame.

* * * * *